Sept. 9, 1958      E. HEEN      2,851,367
PROCESS FOR PRODUCING FROZEN FISH FILLETS
Filed May 4, 1955      6 Sheets-Sheet 1
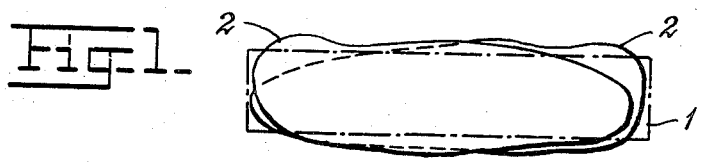
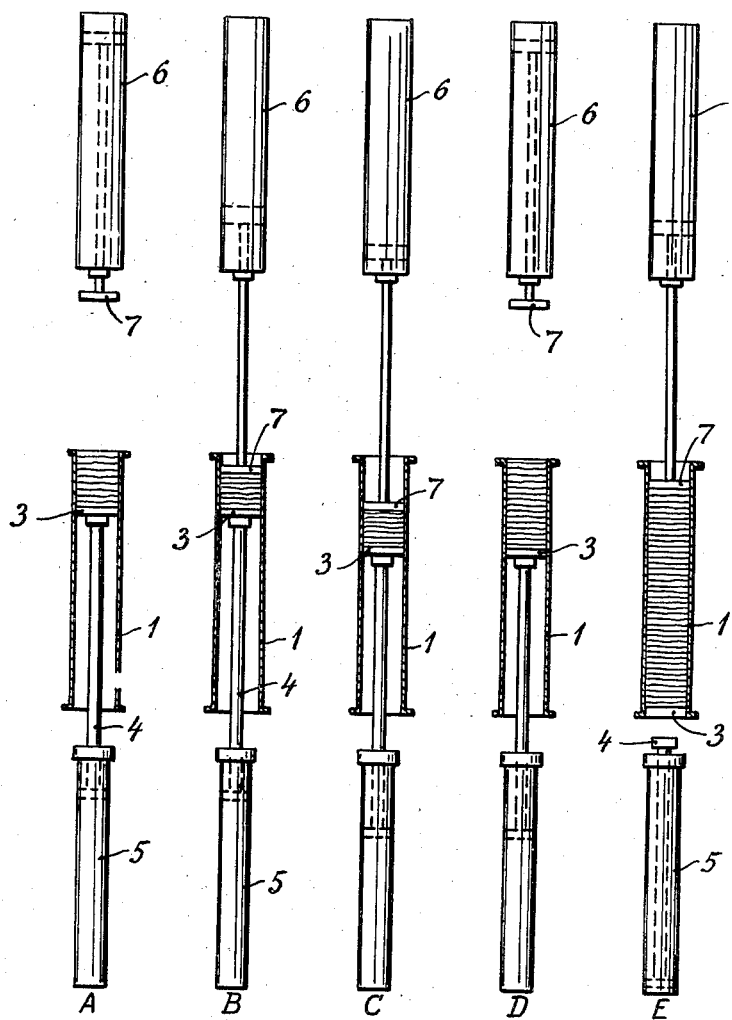
Eirik Heen
By: Watson, Cole, Grindle & Watson
Attorneys Sept. 9, 1958    E. HEEN    2,851,367
PROCESS FOR PRODUCING FROZEN FISH FILLETS
Filed May 4, 1955    6 Sheets-Sheet 2
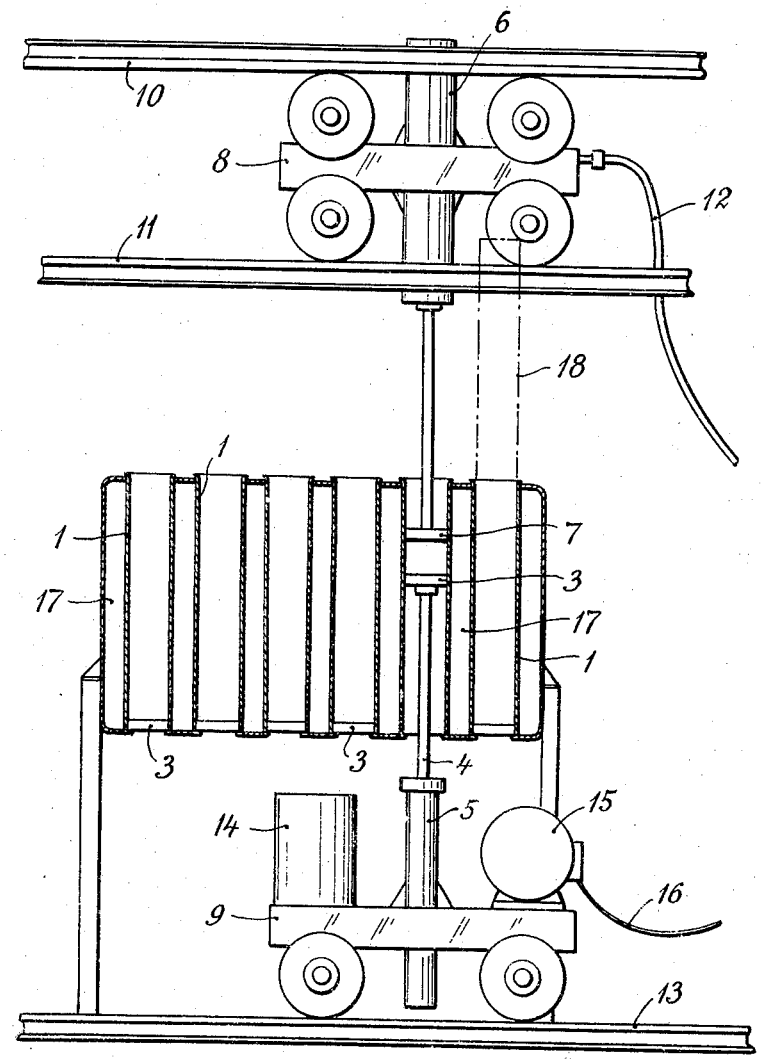

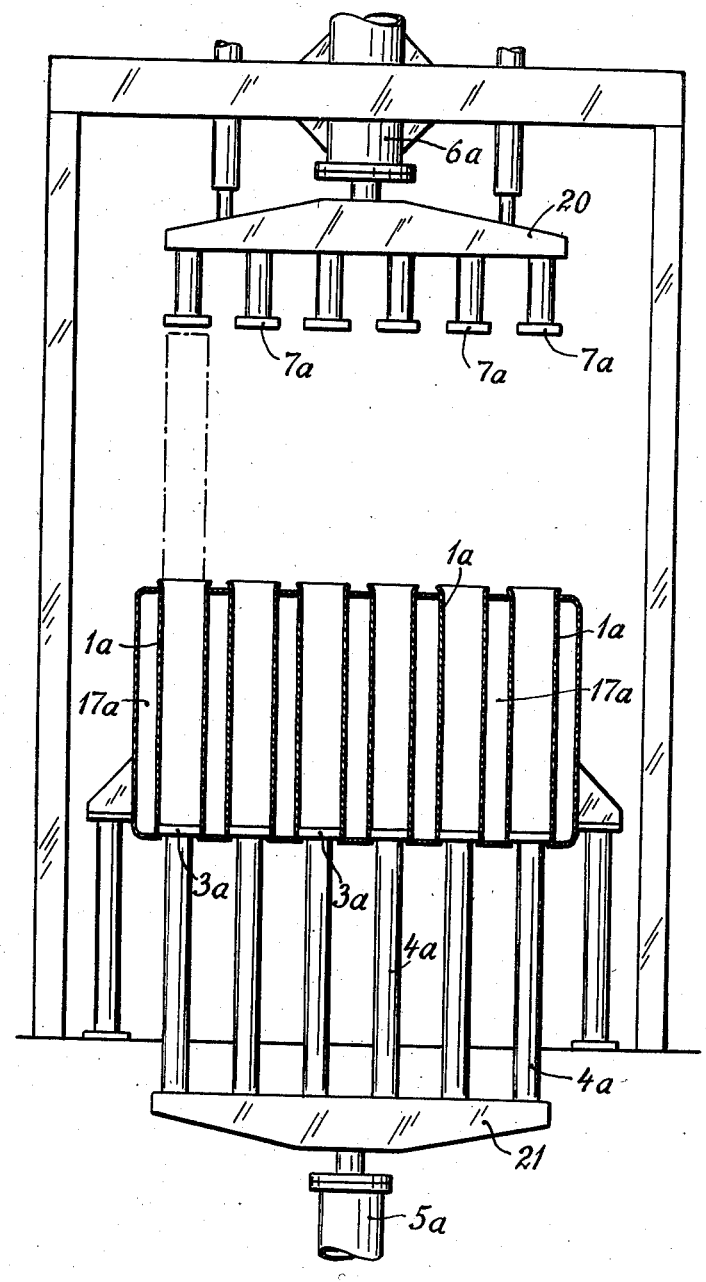

Sept. 9, 1958
E. HEEN
2,851,367
PROCESS FOR PRODUCING FROZEN FISH FILLETS
Filed May 4, 1955
6 Sheets-Sheet 4
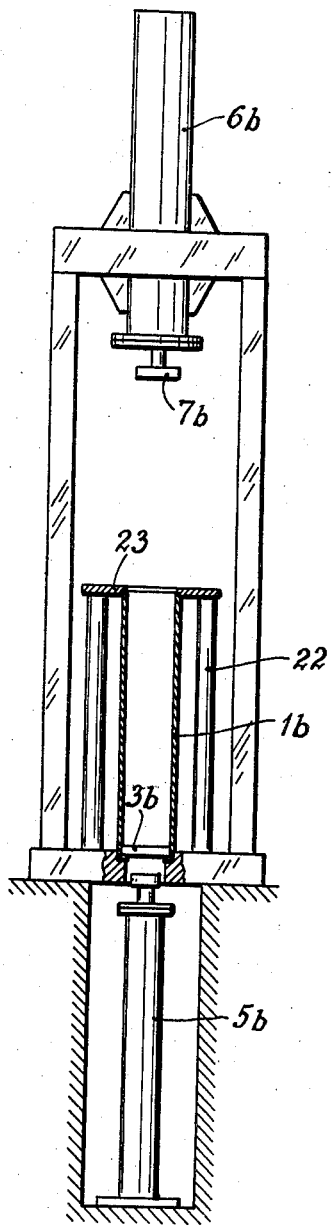
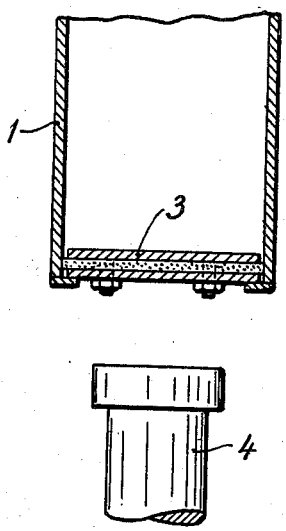
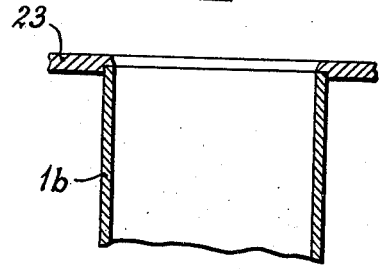
Eivitz Heen
BY: Watson, Cole, Grindle & Watson
ATTORNEYS

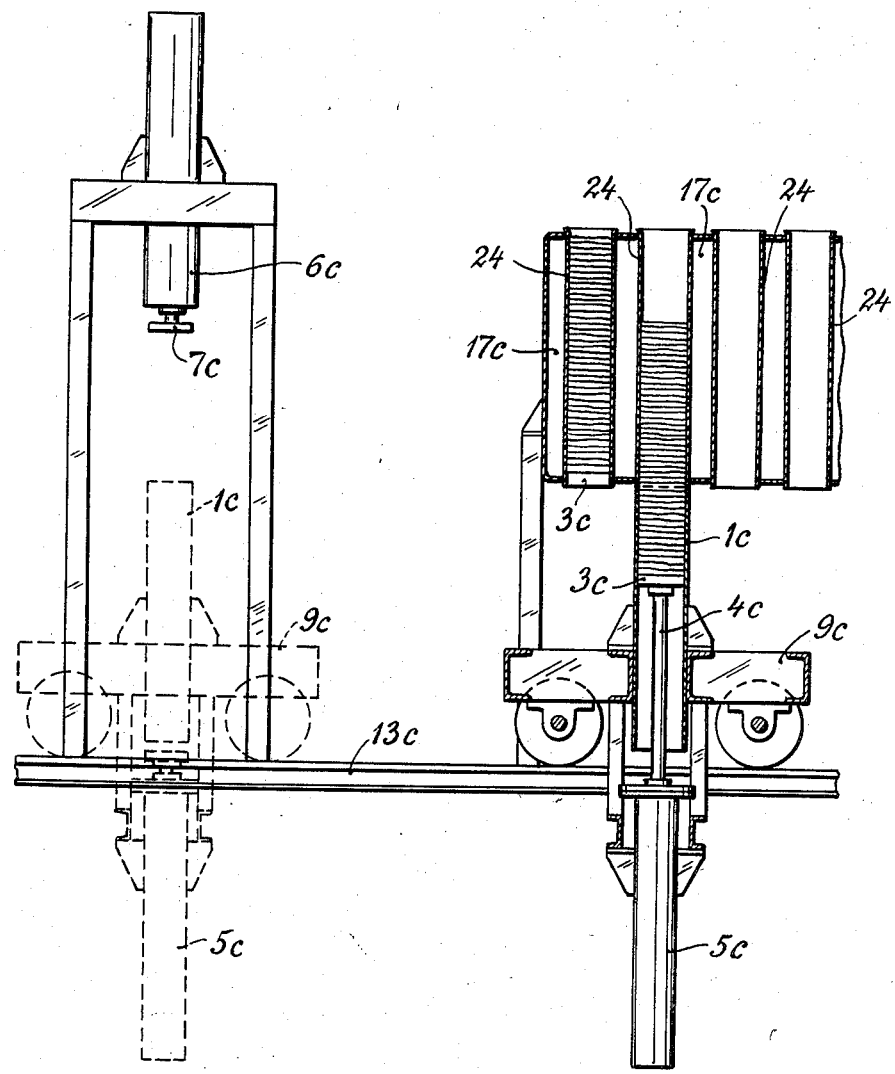

Sept. 9, 1958     E. HEEN     2,851,367
PROCESS FOR PRODUCING FROZEN FISH FILLETS
Filed May 4, 1955     6 Sheets-Sheet 6

Eirik Heen
By: Watson, Cole, Grindle & Watson
ATTORNEYS

United States Patent Office 2,851,367
Patented Sept. 9, 1958

2,851,367
PROCESS FOR PRODUCING FROZEN FISH FILLETS

Eirik Heen, Bergen, Norway, assignor to Norsk Frossenfisk A/L, Oslo, Norway

Application May 4, 1955, Serial No. 506,045

Claims priority, application Norway May 7, 1954

3 Claims. (Cl. 99—195)

The usual procedure in the production of frozen portions of meat from vertebrata, particularly fish musculature such as fish fillets and the like, consists in that the portions are at first weight measured from pieces of fresh fish or the like, to a standard weight of for example 350 grammes by exchanging larger and smaller pieces whereafter the pieces are placed in a flat box which supports the material during the freezing process, which is mostly effected between cold plates and under a slight pressure with a view to a good heat transfer.

In this process, especially the weighing of the portions is very time-wasting, further, the freezing in boxes which are not actually necessary as a packing for the goods but serve to support the material during the packing and freezing, involves a substantial reduction of the capacity of the freezing apparatus.

It has also been tried to freeze under pressure single layers of fish fillets in the form of slabs, intended for a later division into strips, but without success, since the strips were not homogeneous and besides, fell apart during the preparation. The pressures which have been used in this connection have, at the most, been about 0.1 to 0.2 kg. per cm.$^2$.

The present invention has for an object to eliminate the drawbacks of previously known processes, and is based on the observation that it is possible, by subjecting the fish musculature in fresh condition to relatively high pressures, to effect a deformation whereby muscle fibers are mutually displaced in the longitudinal direction without the occurrence of discernible damage in the tissue and consequent loss in quality. On the basis of this discovery, the present process has been developed which is primarily characterized in that the fibers of meat in a fresh condition are placed in a closed pressing-form in which they are kept tightly confined between walls extending largely parallel to the main direction of the fibers and in the form are subjected, in a direction largely at a right angle to the fibers, to a considerable pressure conveniently of about at least ½ kg. per cm.$^2$, which is sufficient to effect such an extensive deformation of the pieces even in the plane at right angles to the pressing direction and especially in the direction of the fibres, that they are caused to fill the cross-sectional shape of the form, and that the pressed block thus produced is thereafter frozen and finally divided along planes at right angles to the pressing direction.

Consequently by this method, there is formed by the pressing operation a substantially homogeneous block having a substantially even specific gravity and capable after freezing to be divided into suitable portions by volume, so that the cumbersome weight-measuring is eliminated and likewise a filling-up of the freezing apparatus with boxes for weighed portions. Due to the fact that the division is effected transversely to the pressing direction, it will in the first instance take place longitudinally of the muscle fibres, and in the second instance so that the longer side of the small divided pieces is always formed by the walls of the pressing-form. In this manner it is possible to obtain a slab which, to a great extent, has conserved the qualities of the original fish fillet.

In order to obtain the desired deformation with complete filling of the pressing-form, the conditions during pressing should be adapted to the condition of the raw material. If the muscles have been taken from freshly killed fish before rigor mortis has started developing, a satisfactory deformation takes place already at moderate pressures—down to about 0.5 kg. per cm.$^2$—whereas fishes in full rigor require higher pressures. As a rule, pressures between about 0.5 to 3 kg. per cm.$^2$ will be used in practice, though it is possible per se to use pressures as high as 5.0 kg. per cm.$^2$ or even higher.

It is further of importance for obtaining a homogeneous block, that the pieces fuse together and are caused to stick to each other by the pressing operation. In the case of freshly killed fishes this is mostly possible merely by using the said pressures, but if rigor mortis has occurred or if particularly rigid musculature, for example from cod, haddock, etc., is involved, a preliminary treatment of the raw material may be desirable with a view to a better fusing. For this purpose one may effect a preliminary pickling in salt solutions in a manner known per se but, according to the invention a better result is obtained by dipping the raw material into a solution of actomyosin of as high a concentration as possible, which agent can be produced by extracting the same raw fish material with a solution of 5% sodium chloride or potassium chloride and sodium bicarbonate at pH 7.2 to 7.4.

An observation which is of importance for carrying out the method in practice, is that the total pressure required for the necessary deformation increases with the height of the pressed layer, since when using a moderate pressure (1 to 3 kg. per cm.$^2$) this height should not exceed 5 to 10 cms. if a homogeneous block should be obtained. With a view to this, one may according to the invention, arrange that the form is filled in portions and the content is subjected to pressure after each portion has been filled in. A particularly practical way of doing this is to use for the pressing operation a lower and an upper piston, which can be moved up and down in the pressing-form while closely engaging the walls of the form and of which the upper piston is lowered a distance corresponding to the pressed portion after each pressing operation and is kept stationary in this new position, whereas during each pressing operation the upper piston is pressed against the material with a suitably chosen pressure and thereafter during the lowering of the bottom piston pushes the material down the height of one portion, and is finally lifted from the form to a starting position, whereby the space above the material within the form becomes accessible for filling. Hereby it is at the same time obtained that it is only necessary each time to fill a relatively low space within the top of the form, and hence in the case of a deep form the trouble of stacking fish pieces exactly to a great depth is avoided.

In order that the block shall keep together until it has been frozen, it is further of importance that after pressing it is kept confined on all sides between vertical walls and is also supported at the bottom until it has been frozen. This may be obtained by effecting the freezing while the block is still in the pressing-form as the latter can be mounted in a freezing apparatus or after pressing can be moved, together with its content, from a pressing apparatus to a freezing apparatus. Another possibility consists in after pressing to displace the content of the pressing-form vertically into a corresponding container in a freezing apparatus while transferring the bottom of the pressing-form to the freezing container.

The removal of the frozen block can be effected by expelling it vertically after heating the same superficially in known manner.

In general, the frozen block will be produced with a width transversely to the direction of the fibres considerably less than the length in this latter direction and likewise, with a height considerably greater than the width, and often also with a height greater than the length, i. e. the block will have its smallest dimension at right-angles to the pressing direction and to the main direction of the fibres. If now it is arranged that during freezing the block can practically only expand in one definite direction which is normal to its smallest dimension, preferably the direction in which the block has been compressed, that is for example upwards, as would be the case when using a confinement on all sides and support in the bottom as referred to above, an irregular surface shape caused by the expansion during the freezing of the confined block can only appear on one single small side, the block having exactly determined dimensions on the remaining sides. Besides, an irregularity of this kind may be counteracted by keeping the surface of the block on the side towards which it expands during freezing, under a yielding pressure by means of a movable wall, for example by keeping the latter under a predetermined hydraulic pressure or loading it with a spring or a weight. Further, in the case of a quick freezing whereby the fillet layer adjacent to the walls freezes fast in a short time, it may be convenient to impart a vibrating movement to this wall.

Further features of the invention will appear from the following specification having reference to the drawings which, in part, illustrate the course of the process and, in part, show various forms of apparatus adapted to be used when carrying out the process.

Fig. 1 is a diagrammatic top-view showing substantially the relative dimensions of the pieces, for example fillets to be pressed, and the cross-sectional shape of the pressing-form.

Figs. 2A to E are diagrammatic views in elevation showing the pressing-form in section and appurtenant pistons at different stages of the pressing process.

Fig. 3 is a sectional view on a larger scale of the lowermost part of the pressing-form together with the top of the corresponding bottom piston.

Fig. 4 illustrates a combined embodiment of the pressing and freezing apparatus with movable pistons.

Fig. 5 illustrates another embodiment, in which several pistons are operated in common.

Fig. 6 illustrates an embodiment with a removable pressing-form.

Fig. 7 illustrates on a larger scale the uppermost part of the pressing-form in Fig. 6.

Fig. 8 illustrates an embodiment in which the pressing-form and the bottom pistons are moved in common from the pressing to the freezing apparatus.

Figure 9:
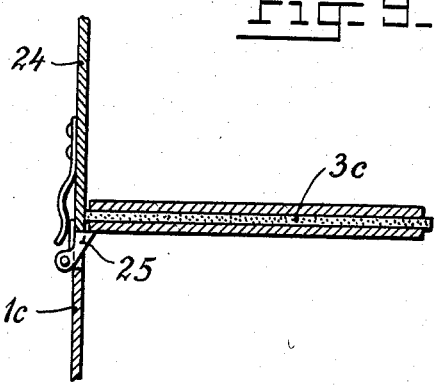
Fig. 9 is a vertical sectional view on a larger scale of a detail of Fig. 8.

When carrying out the process according to the invention it will, as a rule, be contemplated to produce rather high parallelepipedic blocks in which the pieces, for example the fillets, rest upon each other in a large number. With a view to this correspondingly high pressing-forms are used in which the pieces can be stacked to a height many times the height of each piece. In order to obtain a deformation of the pieces mainly in the longitudinal direction the area of the form in horizontal projection which is indicated by the rectangle 1 in Fig. 1, may be dimensioned so that the pieces 2 have room lengthwise, the form being at the same time somewhat narrower than the pieces, so that when these are inserted they must be folded up on the edges or, if desired, the broadest portions are cut off so that they fit the form. Thus, suitable dimensions for the pressing of fish fillets may, for example be a width of 8 to 10 cms., a length of 40 to 60 cms., and a height of the same order as the length. To make the stacking as compact as possible the fillets are placed alternately with opposite orientation, so that the head and tail piece of superposed fillets are placed upon each other, likewise as shown in Fig. 1.

The filling is conveniently effected from the top and in portions as illustrated in Fig. 2, which shows the course of the pressing operation. The form 1 is open at the top and equipped with a movable bottom 3 which fits closely to the walls of the form and at the same time forms a piston head for a displaceable bottom piston 4. The piston 4 can be moved up and down, for example by means of a suitable pressure fluid in a pressure cylinder 5 or by means of a toothed rack or in another manner.

At a distance above the form 1 there is placed a second pressure cylinder 6 for operating an upper piston 7 which fits the form 1 and can exert a suitably adjusted pressure on the content of same, for example, it may be operated by compressed air and/or the pressure space above the piston may be connected to a suitable relief valve. In addition, the piston 7 may be equipped with a flap valve (not shown) which when the piston is lifted from the content of the form 1 admits air to the latter.

When the form is to be filled the bottom piston 4 is at first placed in a position as shown in Fig. 2A, in which an open space suited for filling in one portion is left in the form above the piston. That is, the space must be somewhat higher than the desired height of a pressed portion, since if the latter shall be about 5 to 10 cms. high a compression of about 1 to 3 cms. must be taken into account according to the nature of the pieces, and the accuracy of the filling. The filling in may take place manually or may, if desired, be done mechanically by filling at first boxes or trays having the same shape of the form in horizontal projection and adapted to be moved in over the top of the form, whereafter the content is dropped by opening the bottom of the tray.

After the first layer has been filled in, the upper piston 7 is moved down to the position shown in Fig. 2B and presses the content together, and the pressure is maintained for a time determined by experience, for example 20 seconds, which is sufficient to permit the fillets to be deformed so that they fill out the cross-section of the form completely in the space between the pistons, and to have the pressure equalised in the whole layer. Now the bottom piston 4 is released so that the upper piston can displace both pistons with the intermediate fillet layer to the next position as shown in Fig. 2C in which the bottom piston is again stopped. This may be done by manual operation while observing the position of the upper piston or automatically, in response to this position. The position is chosen so that the free height above the fillet layer becomes the same as the height above the bottom piston in Fig. 2A so that the same packing volume is obtained for the next portion. Thereafter the upper piston is again raised to the uppermost position so that the form becomes accessible for filling in the second portion. Thereafter the whole is repeated, the bottom piston being lowered after each pressing operation by a distance corresponding to the height of a pressed portion, and finally a continuous pressed block is obtained as shown in Fig. 2E.

This block is now ready for freezing. As shown in Fig. 2E and more clearly in Fig. 3, the movable bottom 3 of the form 1 may be loose, that is, not permanently connected to the piston rod of the bottom piston 4, and the form 1 may be provided with projections at the lower end for supporting the bottom. Hereby, it is possible to lower the bottom piston to a position in which it is free of the form in case it should be required, after finishing the pressing, to move the form relative to the bottom piston as explained in the following.

Thus Fig. 4 shows an embodiment in which the pressure cylinder 6 for the upper piston 7 and the pressure cylinder 5 for the lower piston 4 are each mounted displaceably on a trolley 8 or 9 respectively, in order to be moved along a row of fixed forms 1, which are filled in succession. The trolley 8 is guided between the lower and upper rails 10 and 11 respectively, and has compressed air supplied to the cylinder 6 through a flexible tube 12, while the trolley 9 is running on rails 13 and carries the hydraulic equipment for the cylinder 5, comprising a pressure tank 14 and a pump driven by an electric motor 15 with a flexible supply cable 16. In this embodiment the forms 1 are mounted directly in a freezing apparatus as they are surrounded by a cooling space 17, for example in the form of a jacket, coiled tube or the like, through which the cooling medium such as brine or air, may be circulated, or in which a suitable vaporising fluid may expand.

When the pressing forms are mounted in a cooling apparatus as shown, it is quite possible to make the cooling medium circulate already while the pressing is in progress, whereby the initial freezing of the lowermost layer is obtained before the form is full, but since the pressing time may be very short relative to the time of cooling, and since the cooling may also hamper the packing and the piston movement, it will as a rule be preferred to arrange that all forms which are in connection with a common freezing spaced (freezing unit) are packed completely before the cooling starts.

After the freezing of a block has been finished it is expelled by means of the bottom piston 4 to a position on top of the form as indicated in dash-and-dot lines at 18 for the form to the extreme right in Fig. 4, whereafter the block is removed. This is repeated for all the forms in a freezing unit, whereafter all the forms can be filled again. With a structure comprising a number of cooling units in a row, it is then possible to adapt the number of freezing units and the number of forms in each unit so that it is possible in continuous operation to effect the filling of the units in succession and subsequent freezing, and that when returning to the first unit the same has been frozen and is ready for expelling.

In order that the block shall loosen from the form after freezing, it may be heated superficially in known manner, for example by passing a heated medium through the space which was previously used for a cooling medium. In the case of a direct expansion hot gas may be introduced from the compressor, and when using other cooling mediums hot gas, steam or liquid may be used.

For the removal of a frozen block from the form it might be contemplated merely to rely on a heating as explained while using forms open at the bottom, and let the block slide out by its own weight, but in practice it has been found that when using straight vertical forms as described, it is difficult for the block to fall out by itself, and that therefore a positive expelling is preferable.

An alternative arrangement is shown in Fig. 5, in which likewise a number of forms 1a are mounted in a freezing apparatus and surrounded by a cooling medium 17a, but in which the forms are filled simultaneously, one upper piston 7a and one lower piston 4a being provided for each form, and the upper and lower pistons being mounted on common yokes 20 and 21, operated from common pressure cylinders 6a and 5a respectively. In this case the bottom pistons may have fixed piston heads 3a if desired. Apart from this, the freezing and expelling of the blocks 18 may take place in a manner corresponding to that described for Fig. 4.

However, as mentioned previously, it is also possible after pressing the blocks to transfer these to a freezing apparatus instead of having the forms permanently mounted in the freezing apparatus.

In that case, for example, movable pressing-forms may be used which are provided with a loose bottom and after pressing are transferred together with their content to a freezing apparatus. An embodiment for this is shown for one single form in Fig. 6, in which the pressing-form is made as a removable tank 1b with loose bottom 3b, and is held in position in the framework 22 of the pressing apparatus by means of a detachable centering plate 23 at the top as illustrated more clearly in Fig. 7. Here the filling and pressing may take place in a stationary pressing apparatus in a manner similar to that described in connection with Fig. 5, whereas the freezing may take place according to known methods such as irrigation with brine, a cold air current, etc.

Fig. 8 shows an embodiment in which the pressed blocks are transferred from the pressing-forms to a freezing apparatus.

The pressure cylinders 6c for the upper pistons 7c have a fixed mounting in the pressing apparatus, whereas the pressing-forms 1c and the pressure cylinders 5c for the lower pistons 4c are mounted on a trolley 9c running on rails 13c, whereby the pressing-forms after pressing can be moved into a position straight under a row of freezing containers or forms 24. These have an internal shape corresponding to that of the pressing-forms, and are fixed in a freezing apparatus and surrounded by the space 17c for a cooling medium in a manner similar to the pressing forms in the embodiment in Figs. 4 and 5. The freezing-forms are placed in rows one behind the other in the direction of movement of the trolley, so that the forms of one row may be filled in succession from the same pressing-form 1c, and they are mounted at such a level that their bottom edge is practically flush with the upper edge of the pressing-form, so that by means of the lower piston 4c the block can be displaced directly from the pressing-form to the freezing form while being confined on all four sides within a continuous shaft.

To permit the transfer of the blocks the freezing-forms must, of course, be open at the bottom, and in order that in spite of this the block may be supported in the freezing-form, the movable bottom 3c of the pressing-form is moved over from the pressing-form to the freezing-form simultaneously with the transfer of the block, and is supported in the freezing-form by springloaded pawls 25 as shown in Fig. 9.

The use of a movable loaded wall during the freezing as referred to in the introduction to the present specification, has not been shown specifically in the drawings, but can be realised in all the embodiments shown by using covers which fit within the freezing-forms and are subjected to yielding pressure by means of springs or weights or, for example, in an embodiment according to Fig. 5 by hydraulic pressure exerted through the upper cylinder 6a in case the freezing takes place in the pressing-forms themselves. If a vibration is desired one may use a pulsating hydraulic pressure or any known vibratory device acting on the top of the cover.

Figure 10:
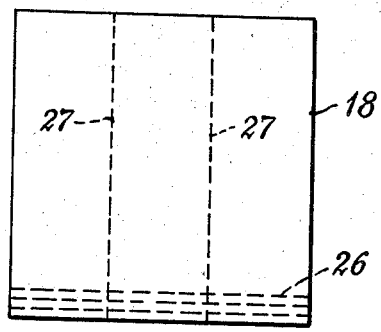
Figs. 10 and 11 are side and front views respectively of a pressed block, with dividing lines inserted.
Figure 11:
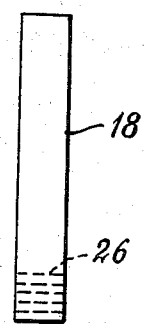

By a pressing and freezing in forms as described above, it is possible to produce a homogeneous and parallelepipedic frozen block, the specific gravity of which is so uniform and so unvaried from one block to the other, that by a division by volume blocks of constant weight may be obtained with a very small tolerance of, for example about 1%. The division may be effected by sawing, cutting or in another convenient manner so as to produce suitable small portions which may be wrapped in suitable packings by means of usual packing apparatus. The cutting planes are mainly placed transversely to the pressing direction as shown by the line 26 in Figs. 10 and 11, if desired with the addition of one or a few cross-cuts as shown at 27. Hereby slab-shaped portions are obtained which will not fall apart by cutting, frying and other preparation, since by the pressing and the possible use of binders the fillets have been made to adhere together so as to form a solid whole, and the binding layers which extend longitudinally of the fish fibres will have the greatest coherence in the longitudinal direction of the fibres which is also the longitudinal direction of the slabs. For the slabs a thickness of about 1.5 to 3.00 cms. is mostly preferred, whereas the length may be up to about 20 cms.

Figure 12:
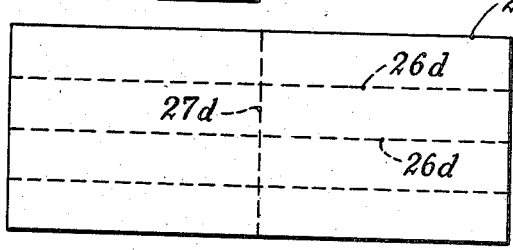
Fig. 12 is a side view of a portion cut from a frozen block, with inserted dividing lines for division into smaller portions.

If desired, one may at first effect a coarse division into small blocks 28 as shown in Fig. 12, for example with a length of about 20 cms. and a height of about 8 cms., and eventually subdivide these further by horizontal cuts 26d and for example one single cross-cut 27d.

Since according to the above description the width of the block may be about 8 to 10 cms., a division in the vertical-longitudinal plane may as a rule be dispensed with, which is an advantage with a view to obtain the greatest possible uniformity of the pieces, since the width of the slabs will thereby always be determined by the width of the pressing-form.

I claim:

1. The process of producing frozen fish fillets which comprises introducing one layer of fresh pieces of fish into a confined zone defined by pairs of spaced-apart side and end walls, the height of said walls and the spacing between one of said pairs being substantially greater than the spacing between the other pair, and a top and bottom wall, at least one of which is movable forward and away from the other within the side and end walls, arranging said pieces within said zone so that the fibres thereof extend generally at right angles to the smallest dimension of said zone, applying a pressure of at least 0.5 kg./cm.$^2$ to one of said top and bottom walls while maintaining the other stationary, withdrawing said movable wall away from said other wall to permit the introduction of a second layer of pieces, repeating said steps with said second layer, and so on until a block of compressed pieces is formed, and freezing said block while applying pressure to said wall.

2. A process for producing frozen fish fillets which comprises arranging fresh pieces of said fish within a confined three-dimensional area, one dimension of which is substantially less than the other two, so that the fibers of said pieces extend generally at right angles to said smallest dimension, applying to said confined pieces in a direction at right angles both to said smallest dimension and to the fibers of said pieces pressure of at least ½ kg./cm.$^2$ and sufficient to deform said pieces to completely fill a cross section of said area transverse to the direction of pressure, and freezing said pieces while maintaining pressure, said pieces being introduced into said area in layers with each layer being independently subjected to pressure.

3. A process for producing frozen fish fillets which comprises arranging fresh pieces of said fish within a confined three-dimensional area, one dimension of which is substantially less than the other two, so that the fibres of said pieces extend generally at right angles to said smallest dimension, applying to said confined pieces in a direction at right angles both to said smallest dimension and to the fibers of said pieces pressure of at least ½ kg./cm.$^2$ and sufficient to deform said pieces to completely fill a cross section of said area transverse to the direction of pressure, freezing said pieces while maintaining pressure, and vibrating said pieces during freezing.

References Cited in the file of this patent

UNITED STATES PATENTS

| | | |
|---|---|---|
| 335,194 | Hege | Feb. 2, 1886 |
| 1,773,080 | Birdseye | Aug. 12, 1930 |
| 1,939,334 | Burke | Dec. 12, 1933 |
| 1,950,763 | Walter | Mar. 13, 1934 |
| 1,983,768 | Norton | Dec. 11, 1934 |
| 2,114,530 | Gorton | Apr. 19, 1938 |
| 2,196,080 | Reynoldson | Apr. 2, 1940 |
| 2,643,952 | Crowther et al. | June 30, 1953 |